(12) United States Patent
Steinhardt

(10) Patent No.: US 7,984,547 B2
(45) Date of Patent: Jul. 26, 2011

(54) METHOD FOR MANUFACTURING AND/OR REPAIRING COMPONENTS FOR GAS TURBINES

(75) Inventor: Erich Steinhardt, Munich (DE)

(73) Assignee: MTU Aero Engines GmbH, Munich (DE)

( * ) Notice: Subject to any disclaimer, the term of this patent is extended or adjusted under 35 U.S.C. 154(b) by 1326 days.

(21) Appl. No.: 10/568,254

(22) PCT Filed: Jul. 29, 2004

(86) PCT No.: PCT/DE2004/001702
§ 371 (c)(1),
(2), (4) Date: Sep. 5, 2006

(87) PCT Pub. No.: WO2005/016588
PCT Pub. Date: Feb. 24, 2005

(65) Prior Publication Data
US 2007/0007260 A1     Jan. 11, 2007

(30) Foreign Application Priority Data
Aug. 18, 2003 (DE) .................. 103 37 866

(51) Int. Cl.
*B23P 6/00* (2006.01)
*B23K 26/34* (2006.01)
(52) U.S. Cl. ..................... 29/889.1; 29/889.7
(58) Field of Classification Search ............... 29/889.71, 29/527.1, 527.2, 889.1–889.722; 264/279, 264/279.1; 219/121.63, 121.64, 121.85; 228/119, 225, 226; 416/229 R, 229 A, 241 R
See application file for complete search history.

(56) References Cited

U.S. PATENT DOCUMENTS

| | | | | |
|---|---|---|---|---|
| 2,920,868 A | * | 1/1960 | Ackerman et al. | 416/230 |
| 3,697,192 A | * | 10/1972 | Hayes | 416/96 R |
| 4,244,482 A | * | 1/1981 | Baumgart et al. | 220/586 |
| 4,322,596 A | * | 3/1982 | Krakow et al. | 219/73.21 |
| 4,484,959 A | * | 11/1984 | Boucher et al. | 148/524 |
| 4,627,896 A | * | 12/1986 | Nazmy et al. | 428/680 |
| 4,726,104 A | * | 2/1988 | Foster et al. | 29/889.1 |
| 4,736,608 A | * | 4/1988 | Laws et al. | 72/200 |
| 4,832,993 A | * | 5/1989 | Coulon | 427/596 |
| 4,835,357 A | * | 5/1989 | Schalk | 219/121.64 |
| 5,038,014 A | * | 8/1991 | Pratt et al. | 219/121.64 |
| 5,067,234 A | * | 11/1991 | Fraser | 29/889.1 |
| 5,233,150 A | | 8/1993 | Schneebeli et al. | |

(Continued)

FOREIGN PATENT DOCUMENTS
DE         195 47 903         3/1997
(Continued)

OTHER PUBLICATIONS
Patent Abstracts of Japan, vol. 1999, No. 02, Feb. 26, 1999.
(Continued)

*Primary Examiner* — Samuel M Heinrich
(74) *Attorney, Agent, or Firm* — Kenyon & Kenyon LLP

(57) ABSTRACT

A method is for manufacturing and/or repairing components, e.g., blades and blade segments, for gas turbines, e.g., for aircraft engines, by laser-powder build-up welding. Laser-powder build-up welding is performed using at least one substructure, the material build-up by a powder material occurring in the process of laser-powder build-up welding such that the or every substructure is at least in sections enclosed by the built-up powder material.

12 Claims, 3 Drawing Sheets

U.S. PATENT DOCUMENTS

| | | | | |
|---|---|---|---|---|
| 5,665,180 A | * | 9/1997 | Seetharaman et al. | 148/527 |
| 5,701,669 A | * | 12/1997 | Meier | 29/889.1 |
| 5,887,332 A | * | 3/1999 | Champenois et al. | 29/527.3 |
| 6,269,540 B1 | * | 8/2001 | Islam et al. | 29/889.7 |
| 6,364,971 B1 | * | 4/2002 | Peterson et al. | 148/525 |
| 6,469,271 B1 | * | 10/2002 | McGoey | 219/76.14 |
| 6,682,253 B2 | * | 1/2004 | Binna et al. | 403/263 |
| 6,730,178 B2 | * | 5/2004 | Miyamoto et al. | 148/240 |
| 6,872,912 B1 | * | 3/2005 | Wos et al. | 219/121.64 |
| 6,936,118 B2 | * | 8/2005 | Ando et al. | 148/522 |
| 7,449,658 B2 | * | 11/2008 | Mielke | 219/121.66 |

FOREIGN PATENT DOCUMENTS

| | | |
|---|---|---|
| DE | 199 03 436 | 8/2000 |
| JP | 10296470 | 11/1998 |

OTHER PUBLICATIONS

International Search Report, PCT/DE2004/001702.

Written Opinion of the International Searching Authority, PCT/DE2004/001702.

* cited by examiner

US 7,984,547 B2

METHOD FOR MANUFACTURING AND/OR REPAIRING COMPONENTS FOR GAS TURBINES

FIELD OF THE INVENTION

The present invention relates to a method for manufacturing and/or repairing components, e.g., blades and blade segments, for gas turbines, e.g., for aircraft engines.

BACKGROUND INFORMATION

Modern gas turbines, particularly aircraft engines, must satisfy the highest demands with respect to reliability, weight, performance, economic efficiency and durability. In the last decades, aircraft engines were developed, particularly in the civil sector, which fully satisfy the above requirements and have achieved a high degree of technical perfection. Among other things, the selection of materials, the search for new suitable materials and the search for new manufacturing methods and repair methods play a decisive role in the manufacture and also in the repair of aircraft engines.

Numerous methods for manufacturing and repairing components for gas turbines are conventional. This includes, among other things, forging and investment casting. Thus, conventionally, all highly stressed components in the compressor region of a gas turbine are manufactured by forging, whereas the rotor blades, for example, as well as the stator blades of the turbine are investment casting parts. Particularly milling from the solid or joining of finished blades to a rotor holder or a hub by linear friction welding are used in the manufacture of gas turbine rotors having integral blading, of so-called blisks (bladed disks) or blings (bladed rings).

Another conventional method for manufacturing and repairing or restoring blades for gas turbines is the so-called laser-powder build-up welding, which is also called laser beam build-up welding or laser beam generation. Conventionally, laser-powder build-up welding is used particularly in maintenance work and restoration work. Thus it is conventional for blades, which have a short blade length as a result of wear, to be restored by laser-powder build-up welding so that the blades may be reinstated more frequently and consequently do not have to be sorted out prematurely.

A method for manufacturing or restoring blades for turbo engines by laser beam build-up welding is described in German Published Patent Application No. 195 47 903. In the method disclosed therein, a strip of sheet metal is used as a support form. Following the extension of the blade by laser build-up welding, the sheet metal strip is removed and reused.

SUMMARY

Example embodiments of the present invention may provide a method for manufacturing and/or repairing components for gas turbines.

According to example embodiments of the present invention, laser-powder build-up welding may be performed using at least one substructure, the material build-up by a powder material occurring in the process of laser-powder build-up welding such that the or every substructure is at least in sections enclosed by the built-up powder material. Following the laser-powder build-up welding, the substructure used in the method hereof remains inside the manufactured or repaired component and thereby becomes an integral part of it. This may result in a multitude of new design possibilities for gas turbine components, e.g., for stator blades, rotor blades, stator blade segments, rotor blade segments or rotors having integral blading for aircraft engines.

A blade for a gas turbine may be manufactured in that in laser-powder build-up welding a substructure made of a dampening material is enclosed on all sides by the built-up powder material such that the substructure is subsequently positioned in the interior of the manufactured blade. The blade may be, e.g., a hollow blade for a gas turbine, the dampening substructure, e.g., completely filling a hollow space of the manufactured hollow blade.

A gas turbine rotor having integral blading may be manufactured in that a substructure made of forged, cast or powder-metallurgically manufactured material is enclosed by the built-up powder material in the process of laser-powder build-up welding.

Preferred details and aspects of the method according to example embodiments of the present invention are described in more detail below with reference to the appended Figures.

DETAILED DESCRIPTION

Figure 1:
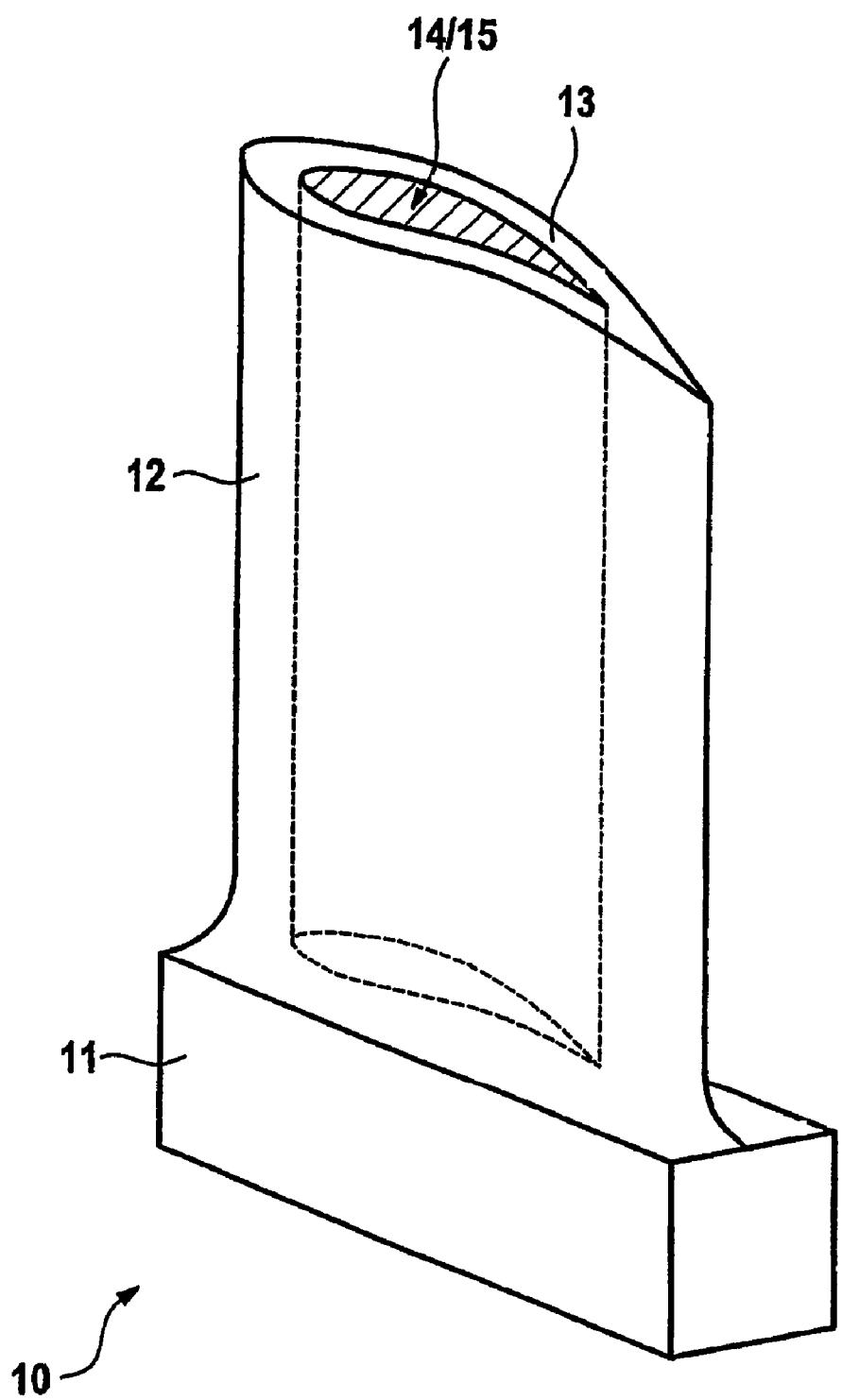
FIG. 1 is a cross-sectional view of a blade of a gas turbine in a schematized perspective lateral view.
Figure 2:
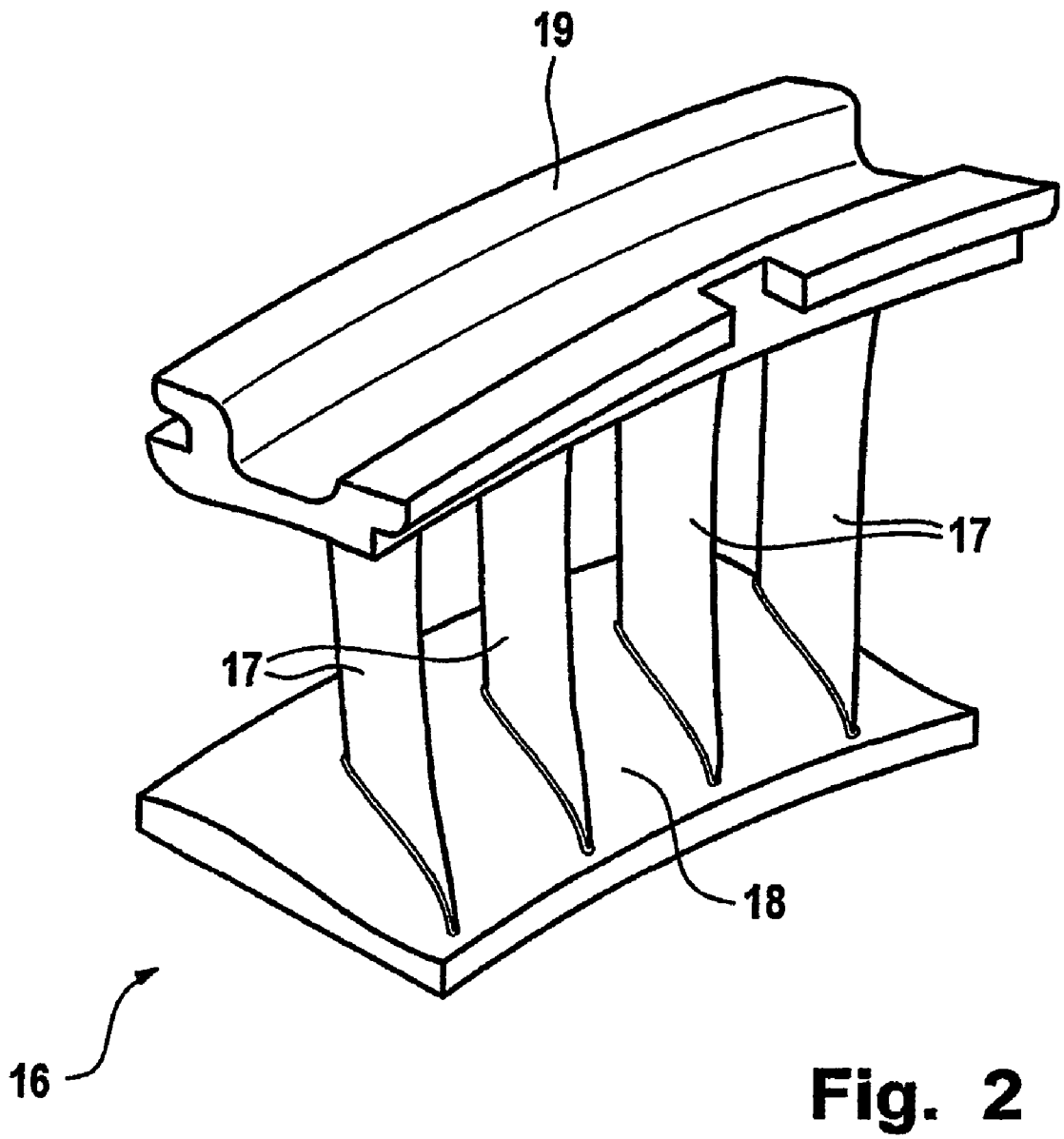
FIG. 2 illustrates a blade segment of a gas turbine in a schematized perspective lateral view.
Figure 3:
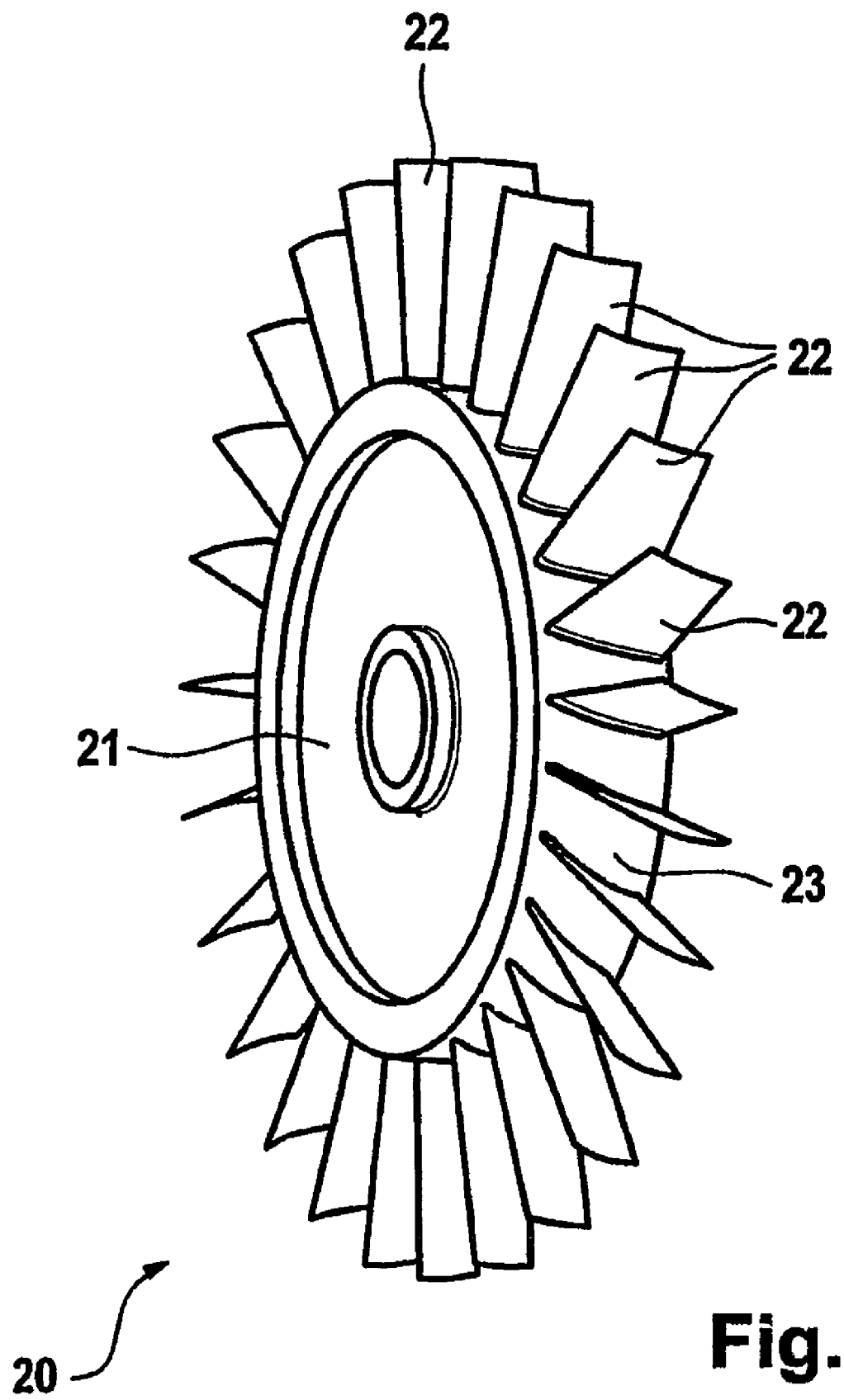
FIG. 3 illustrates a gas turbine rotor having integral blading in a schematized perspective lateral view.

In the following, example embodiments of the present invention are described in greater detail with reference to FIGS. 1 to 3. FIG. 1 illustrates a blade of a gas turbine manufactured using the method according to an example embodiment of the present invention. FIG. 2 illustrates a blade segment, and FIG. 3 illustrates an integrally bladed gas turbine rotor.

FIG. 1 illustrates a rotor blade 10 for a gas turbine including a blade root 11 and a blade 12. FIG. 1 shows a cross-section of blade 12, it being possible to gather from FIG. 1 that rotor blade 10 takes the form of a hollow blade 10. A wall 13 of blade 12 delimits a hollow space 14, a core 15, e.g., made of a dampening material being arranged in hollow space 14. In the exemplary embodiment shown, core 15 made of a dampening material completely fills hollow space 14.

Rotor blade 10 as illustrated in FIG. 1 is manufactured in that core 15 made of a dampening material is used as a substructure for laser-powder build-up welding. The material build-up occurs in the process of laser-powder build-up welding in a manner such that substructure or core 15 is enclosed by the built-up powder material. Substructure or core 15 thus becomes an integral part of rotor blade 10 to be manufactured. In the exemplary embodiment illustrated in FIG. 1, core 15 is enclosed on all sides by the built-up powder material. As already mentioned, core 15 is made of a dampening material which is, e.g., manufactured as a metallic or ceramic felt.

FIG. 2 illustrates a blade segment 16, manufactured with the aid of the method according to an example embodiment of the present invention, having altogether four blades 17, an inner cover strip 18 and an outer cover strip 19. Thus blade segment 16 as illustrated in FIG. 2, for example, may be a blade segment, the individual blades 17 of which in analogy with blade 10 as illustrated in FIG. 1 take the form of hollow blades having cores embedded in their hollow spaces.

Alternatively it is also possible, however, to manufacture blade segment 16 as illustrated in FIG. 2 by using in each case one cast, forged or powder-metallurgically manufactured substructure both for inner cover strip 18 and for outer cover strip 19, the individual blades 17 being built up on these substructures by laser-powder build-up welding.

FIG. 3 illustrates a gas turbine rotor 20 having integral blading, multiple rotor blades 22 being joined to a disk-shaped rotor holder 21. Rotor blades 22 are attached to an outer lateral surface 23 of disk-shaped rotor holder 21 and extend in the radial direction of the same outwardly.

Gas turbine rotor 20 illustrated in FIG. 3 having a disk-shaped rotor holder 21 having integral rotor blades 22 is also called a blisk (bladed disk).

Gas turbine rotor 20 illustrated in FIG. 3 is manufactured in that for rotor holder 21 a forged, cast or powder-metallurgically manufactured disk member made of metal is used, rotor blades 22 being built up on this disk-shaped substructure by laser-powder build-up welding.

Gas turbine rotor 20 may alternatively be manufactured by using the forged, cast or powder-metallurgically manufactured substructure for the rotor holder and also for the rotor blade substructures. In this exemplary embodiment, the substructure for rotor holder 21 may be a metallic substructure and the substructures for rotor blade 22 may be ceramic substructures. The metallic substructure of the rotor holder and the ceramic substructures of rotor blade 22 are then integrally joined by laser-powder build-up welding, the powder-material to be built-up by welding enclosing the substructure for rotor holder 21 as well as the substructures for rotor blades 22 on all sides following the process of laser-powder build-up welding. Accordingly, an integral or form-locking joint between ceramic components and metallic components is realizable with the method hereof.

From the details of the method described in connection with FIGS. 1 to 3 it follows that the method may open up a multitude of design possibilities for gas turbine components. With the aid of the method hereof, it is thus possible to manufacture hollow blades around a core made of dampening material by laser-powder build-up welding. Furthermore, it is possible to manufacture blades, blade segments or gas turbine rotors having integral blading with and without cover strip by embedding cast, forged or powder-metallurgically manufactured substructures into the powder material or laser powder. It is furthermore possible to join components made of different materials in an integral manner. For this purpose, laser-powder build-up welding is performed using at least one substructure, the material build-up by the powder material occurring in the process of laser-powder build-up welding such that the or every substructure is at least in sections enclosed by the built-up powder material.

The laser-powder build-up welding may be carried out in multiple stages or steps, different materials, that is, different powder materials, being used for the laser-powder build-up welding in the individual stages or steps. Metal alloys may be used as powder materials, such as nickel-based alloys or titanium-based alloys, for example. Due to the division of the laser-powder build-up welding into multiple stages and the use of different powder materials, it is possible to construct subassemblies, e.g., blades, for gas turbines from different metal alloys and thus to optimize the properties of the same. Thus, in repairing a blade, it is also possible to extend the blade by building up the extension by welding from a different material than the material of the blade. It is furthermore possible to use different materials for the rotor blades and the rotor holder in manufacturing integrally bladed gas turbine rotors.

As already mentioned repeatedly, the method may be suited for manufacturing individual blades, for manufacturing blade segments, for manufacturing gas turbine rotors having integral blading and for manufacturing other components for gas turbines, etc. Thus, it is also possible, for example, to manufacture fastening elements or housing sections for gas turbines using the method hereof. The blade segments may be constructed with or without a cover strip and may include at least two blades.

The details of laser-powder build-up welding should be familiar to the person skilled in the art addressed here. Very briefly only it should be pointed out that in laser-powder build-up welding the powder material is sprayed from a powder gun onto the substructure and that a laser beam heats the powder material such that the powder material is joined with the substructure or is built up by welding.

What is claimed is:

1. A method for at least one of (a) manufacturing and (b) repairing a component for a gas turbine by laser-powder build-up welding, comprising:
performing laser-powder build-up welding using at least one substructure, the material built-up by a powder material occurring in the laser-powder build-up welding such that each substructure is enclosed on all sides by the built-up powder material.

2. The method according to claim 1, wherein the component includes at least one of (a) a blade and (b) a blade segment.

3. The method according to claim 1, wherein the gas turbine is arranged as a gas turbine for an aircraft engine.

4. The method according to claim 1, wherein a blade for the gas turbine is manufactured by the laser-powder build-up welding such that a substructure made of a dampening material is enclosed on all sides by the built-up powder material and the substructure is subsequently positioned in an interior of the manufactured blade.

5. The method according to claim 4, wherein the blade is a hollow blade, the substructure completely filling a hollow space of the hollow blade.

6. The method according to claim 4, wherein the substructure includes at least one of (a) a metallic and (b) a ceramic material.

7. The method according to claim 1, wherein a gas turbine rotor having integral blading is manufactured by the laser-powder build-up welding such that a substructure formed of at least one of (a) forged, (b) cast and (c) powder-metallurgically manufactured material is enclosed by the built-up powder material.

8. The method according to claim 7, wherein the substructure is in the form of at least one of (a) a disk-shaped and (b) a ring-shaped rotor holder, rotor blades built up on the rotor holder by the laser-powder build-up welding.

9. The method according to claim 7, wherein, in addition to substructure formed of at least one of (a) forged, (b) cast and (c) powder-metallurgically manufactured material forming a rotor holder, substructures are used for rotor blades, the substructure for the rotor holder and the substructures for the rotor blades enclosed by the built-up powder material by the laser-powder build-up welding.

10. The method according to claim 9, wherein the substructure for the rotor holder is made of a different material than the substructures for the rotor blades.

11. The method according to claim 9, wherein the substructure for the rotor holder is made of a metallic material and the substructures for the rotor blades are made of a ceramic material.

12. The method according to claim 9, wherein the substructure for the rotor holder is integrally joined with the substructures for the rotor blades by the laser-powder build-up welding.

* * * * *